Oct. 24, 1933.    J. F. G. PETIT    1,932,164
ELECTRIC REGULATING APPARATUS
Filed Dec. 11, 1931

J. F. G. Petit
INVENTOR

By: Markes & Clerk
Attys.

Patented Oct. 24, 1933

1,932,164

UNITED STATES PATENT OFFICE 1,932,164

ELECTRIC REGULATING APPARATUS

Jean François Gabriel Petit, Paris, France, assignor to Etablissements Labinal, St.-Ouen, France Application December 11, 1931, Serial No. 580,390, and in France December 17, 1930

5 Claims. (Cl. 200—87)

The present invention relates to apparatus which serve to regulate the potential of the current supplied by an electric generator.

Potential regulators are already in use, which comprise an electro-magnet subjected to the potential of the current supplied by a generator and acting upon a soft iron armature urged by a return spring and carrying a movable contact-piece co-operating with a stationary contact-piece, these two contact pieces being shunted by a resistance, which latter is in series with the field winding of the generator. Variations of the potential of the current supplied by the generator will produce variations of magnetic flux in the electro-magnet, thus causing the soft iron armature to vibrate; the resistance, which is mounted in series with the field winding is thus alternately inserted into the circuit and short-circuited due to the separation and closing of the contacts. This causes continual variations of the field current of the generator, and the current supplied by the generator is maintained within the limits corresponding to the adjustment.

In this known arrangement, the movable armature offers a certain inertia to the displacements imparted to it by the variations of the flux of the electro-magnet, and its rate of vibration is relatively small, thus reducing the sensitiveness of the apparatus and causing a certain instability of operations, whereby the potential of the current supplied by the generator oscillates between rather wide limits.

Besides, since the displacements of the armature have a relatively large amplitude, the contact-pieces move apart through a substantial distance, and as the variations of the field current are somewhat considerable (owing to the unstable conditions of operation) sparking occurs at the contacts, and hence these are rapidly destroyed.

Finally, no means are provided to enable an accurate adjustment of the apparatus, and the initial adjustment is readily troubled by the vibrations or shocks to which the apparatus is subjected.

The present invention has for its object to devise a regulating apparatus of the above-mentioned type, in which the aforesaid drawbacks are entirely eliminated.

According to the invention, the armature carrying the movable contact-piece is replaced by an elastic diaphragm which is given a certain initial tension at rest. Due to this initial tension, the diaphragm acquires the property of vibrating with a certain natural frequency, which depends upon the degree of the initial tension and can thus be made as great as desired. By reason of this high frequency of the vibration of the diaphragm, the stability of operation and the sensitiveness of the apparatus are greatly increased, thus affording a most accurate regulating of the potential of the current supplied by the generator.

On the other hand, as the diaphragm is under tension, it is less sensitive to the shocks and low frequency vibrations to which the apparatus is subjected. Furthermore, all sparking at the contacts is eliminated, due to the small amplitude of movement of the diaphragm, which, in normal operation, is manifested simply by variations of the contact pressure between the contact pieces.

Another important feature of the invention consists in the provision of adjusting means of a very simple construction and accurate operation by which the adjustment of the tension of the generator current can be modified at will.

In the accompanying drawing, which shows by way of example an embodiment of the invention:

Figure 1:
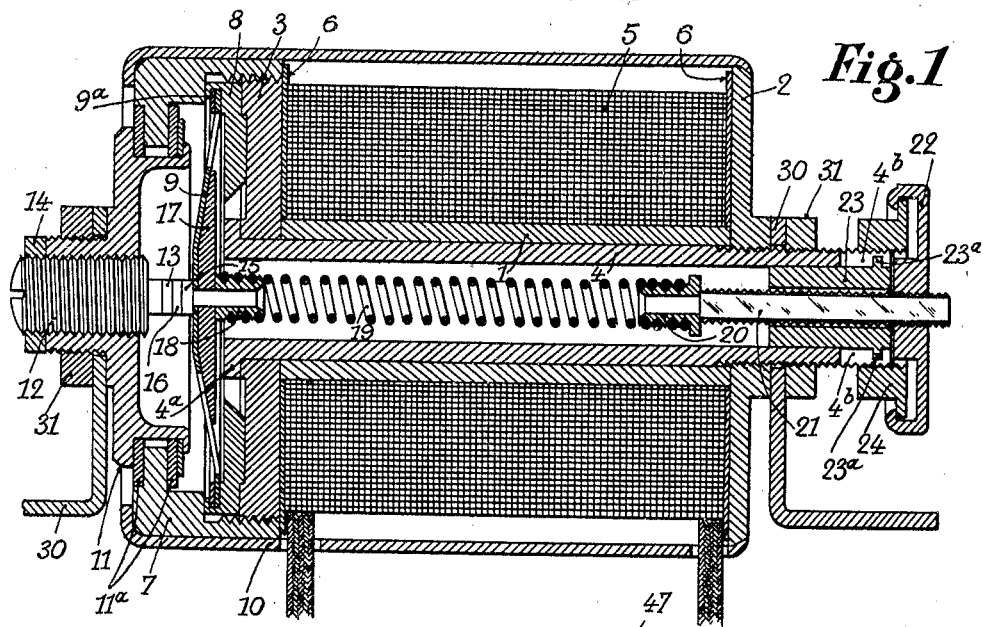
Fig. 1 is a cross-section of the apparatus.

The apparatus consists of a soft iron core 1 forming a spacing member between two end-plates 2 and 3, one of which is of brass and the other of soft steel. The end-plate 3 is in contact with a shoulder 4ª, formed at one end of a central soft steel tube 4, which is threaded at the other end; upon this threaded part is screwed the end-plate 2 which tightens and maintains the whole. On the spool thus formed is mounted the winding 5 of the electro-magnet, between the core 1 and two washers 6 of suitable material, applied against the respective end-plates 2 and 3. A steel socket 7, screwed upon the outer periphery of end-plate 3, serves to hold a soft steel pole piece 8 against the same; said pole piece 8 is clenched to a diaphragm 9, with the interposition of a washer 9ª, whereby diaphragm 9 is rigidly connected with pole-piece 8, at its periphery. A soft steel casing 10 is fitted upon the whole, and is clenched thereto at each end. Upon socket 7 is clenched a brass member 11, with the interposition of insulating washers 11ª; screwed in the central part of member 11 is a screw 12, having a tungsten contact-piece 13, said screw being locked by a nut 14. In the center of diaphragm 9 is a rivet 15, carrying a tungsten contact piece 16, a soft steel pole-piece 17 and a screw-threaded member 18 which serves to hold a spring 19 whose end is screwed in the screwthreads. The other end of said spring is screwed upon a screwthreaded member 20, preferably of insulating material, mounted on a screwthreaded brass rod 21 screwing in a milled nut 22, and upon which are formed four flat sides by which it may slide without rotation in a square hole formed in a sleeve 23. This latter is fitted into tube 4 and is held in position by two studs 23ª, slidable in slots 4ᵇ of tube 4.

Nut 22 is clenched to a member 24, which is screwed on tube 4 and is rotatable thereon. According to the direction in which nut 22 is turned, rod 21 will move axially in one or the other direction, and will thus tension or slacken spring 19.

Two nuts 31, mounted on the free threaded parts of members 4 and 11, serve to secure the attaching lugs 30 of the apparatus, which may be of any suitable size and shape.

Figure 2:
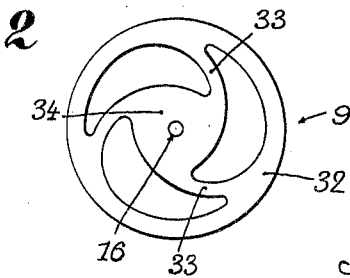
Fig. 2 is an elevational view of the diaphragm.

Diaphragm 9 (Fig. 2) consists of a concave disc of elastic metal, such as spring steel, which is apertured in such manner as to form elastic arms 33 of great length and of spiral shape, connecting the outer rim of the disc with the central part carrying the contact piece 16.

Figure 3:
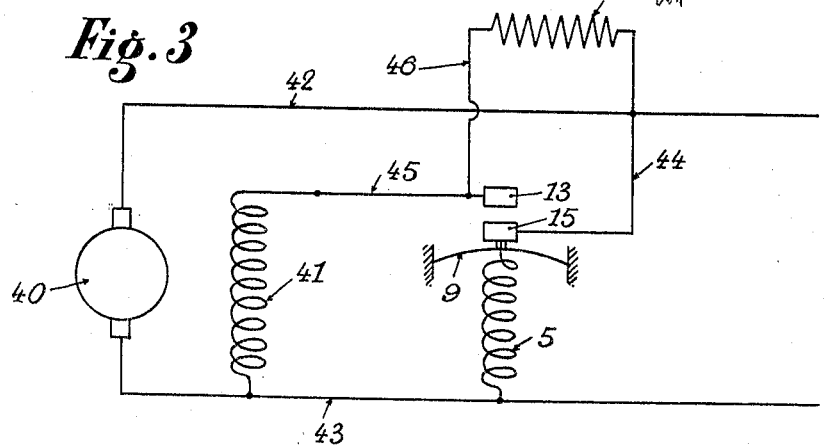
Fig. 3 is a diagram of the circuits.

As usual the winding 5 of the apparatus is so arranged that the regulation is practically unaffected by temperature variations, and it is connected at one end with the tungsten tip 16 (Fig. 3) and by wires 42—44 with one pole of the generator to be regulated, its other end being connected with the generator by a wire 43. The tungsten tip 13 is connected by a wire 45 with the field circuit 41 of the generator. The latter is supposed to have a shunt excitation, winding 41 being connected with wire 42 by a wire 46 and a resistance 47.

For a given potential at the terminals of the generator, the magnetic flux, which is a function of the potential at the terminals of the generator, assumes a determined value, and tends to attract pole-piece 17 together with diaphragm 9, towards pole-piece 8 and the flange 4ª of central member 4, which also acts as a pole-piece.

If, for the initial adjustment of spring 19, the flux is such that its attracting force, added to the tension of spring 19, counterbalances the own tension of the diaphragm so that the tips 13 and 16 are in contact with the proper pressure, any increase in the electric potential, increasing the magnetic flux, will tend to separate the tips, thus increasing the resistance at the contacts.

Inversely, should the electric potential at the terminals be reduced, the elastic tension of the diaphragm will urge the tips together, thus increasing their contact pressure and reducing the electric resistance. When the two tips 13—16 are in perfect contact, the resistance 47, which is in series with the field 41 of the generator, is short-circuited, while this resistance is entirely inserted into the exciting circuit when the tips are separated.

It will be noted that the operation of the apparatus is similar to that of the known potential regulators above mentioned. However the apparatus according to the invention has very important advantages over the known apparatus, due to the fact that the diaphragm has an initial own tension at rest, and hence a capacity of natural vibration at a high frequency and with a small amplitude; also, due to the fact that this tension can be adjusted in two different manners (by means of screw 12 and by means of spring 19); further, by the fact that the regulating spring 19, which is of great length and whose axis coincides with the axis of the apparatus, can be readily controlled from the exterior by a milled knob whose large angular displacements will but slightly change the value of the adjustment of the apparatus, thus securing a quite accurate and sensitive adjustment; again, due to the general arrangement of the parts within a metal case or shield, said parts being readily taken apart by simply removing the casing 10, which latter is clenched in place after the apparatus has been approved after test.

The tungsten of the contact tips 13 and 16 may be replaced by any other suitable material.

Pole-piece 17 may be covered with paper or may be copper-plated, for instance, as well as members 4 and 8, in order to reduce the air-gap to a minimum without any danger of sticking.

The diaphragm 9, which preferably consists of spring steel, may be made of any other metal and may be given any suitable shape and provided with any suitable apertures. It will be selected in such manner that the initial adjustment of its elastic tension, which is obtained by pressing the tips 13 and 16 together by means of screw 12, will provide for a certain preliminary adjustment of the electric potential (taking account of the fact that the air-gap varies as the elastic tension of the diaphragm is changed), the contact pressure between the tips being finally adjusted by means of the spring 19.

It is possible to provide an adjustment of the air-gap which is distinct from the variation of said gap which is due to the adjustment of the tension of the diaphragm.

It should be noted that any wear of the contact tips will tend to reduce the value of the tension for which the apparatus is adjusted, and this is an element of safety.

Having now described my invention, what I claim as new and desire to secure by Letters Patent is:

1. In a tension regulator for electric generators, a cylindrical hollow electro-magnet, a disc-shaped diaphragm coaxial with and secured to the armature of said electro-magnet, means for clamping the rim of said diaphragm, a contact piece on said diaphragm, a cylindrical casing surrounding the whole, a screw carried by said casing coaxially with said electro-magnet, a contact piece rigidly carried by said screw, opposite the first named contact piece, whereby said diaphragm may be distorted by screwing said screw toward said diaphragm, a spring extending axially through said electro-magnet and attached at one end to said diaphragm for pulling thereon in the direction of the above mentioned distortion, an axially adjustable member attached to the opposite end of said spring, and means for securing said latter member in selective positions to said casing.

2. A regulator as claimed in claim 1, wherein said latter member comprises a screwthreaded rod projecting from said casing, said securing means consisting of a control knob screwed on the projecting part of said rod.

3. In an electromagnetic regulator, a switch comprising a fixed contact piece, a magnetic member adapted to be moved in response to the magnetic flux in said regulator, an elastic member operatively connected with said magnetic member, means for holding fast opposite points of said elastic member, a movable contact piece attached to said elastic member intermediate said opposite points, adjustable tensioning means for pressing said fixed contact piece at rest against said movable contact piece and thereby imparting an elastic deformation to said elastic member, and adjustable elastic means for selectively reducing the initial pressure between said contact pieces at rest.

4. An electromagnetic regulator as claimed in claim 3, wherein said elastic member consists of a concave disc provided with apertures forming a number of substantially spiral arms connecting the rim with the central part.

5. An electromagnetic regulator as claimed in claim 3, wherein said tensioning means consists of an adjustable screw rigidly connected with said fixed contact piece and whose axis coincides with the direction of the elastic deformability of said elastic member.

JEAN FRANÇOIS GABRIEL PETIT.